United States Patent Office 3,524,687
Patented Aug. 18, 1970

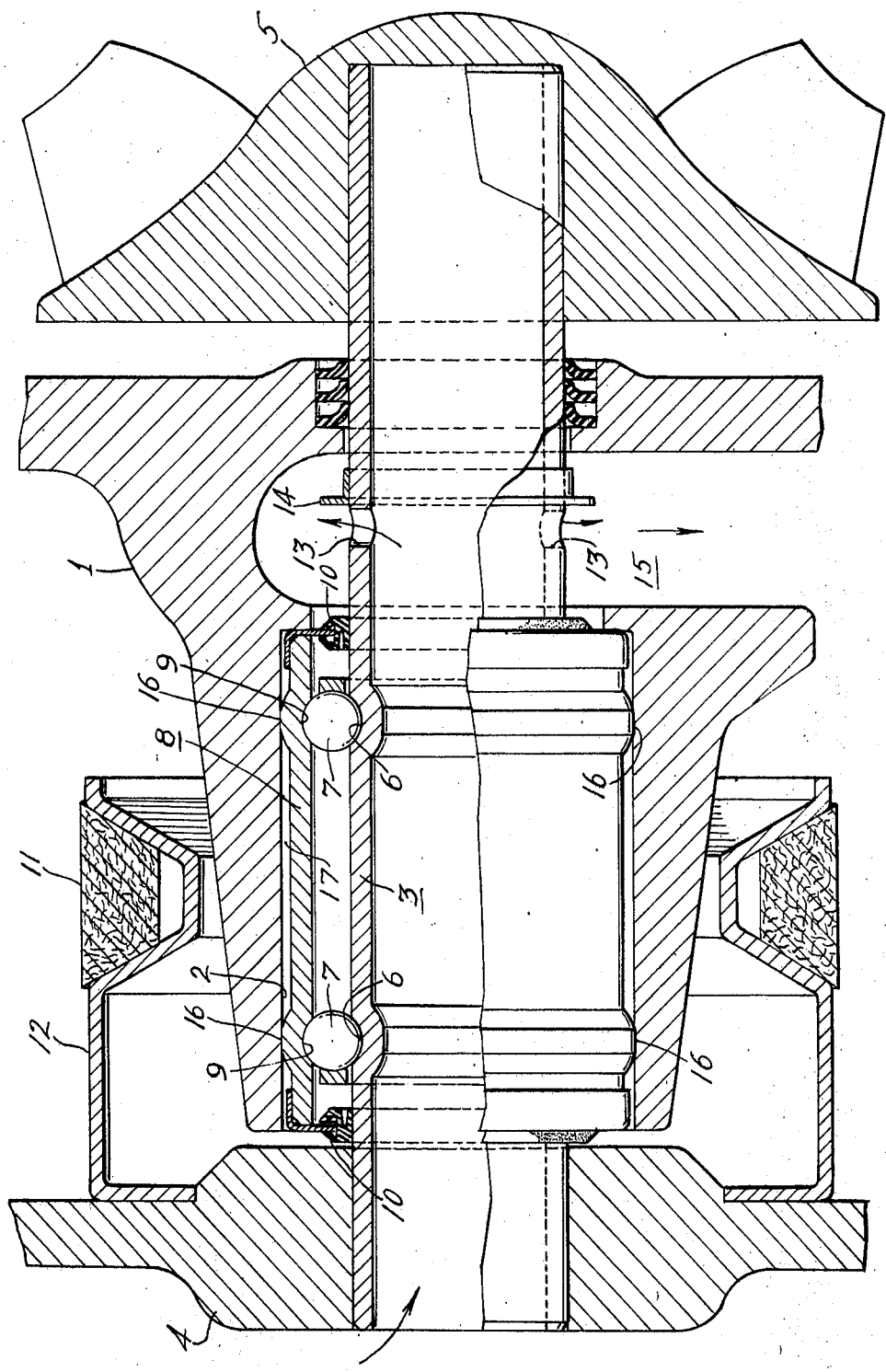

3,524,687
BEARING COMPRISING TWO OR MORE ROWS OF ROLLING BODIES
Stig Lennart Hallerback, Blodboksgatan 12, Vastra Frolunda, Sweden
Filed July 29, 1968, Ser. No. 748,397
Int. Cl. F16c 3/06
U.S. Cl. 308—189        4 Claims

ABSTRACT OF THE DISCLOSURE

A bearing assembly comprising inner and outer tubular members. The outer tubular member circumscribing the inner member and spaced therefrom to define an annular space therebetween. The outer member having at least a pair of spaced apart outer raceways confronting the raceways of the inner member. The bearing assembly also includes a plurality of rolling elements in the annular space defined by the confronting raceways of the inner and outer tubular members. The outer member has a pair of axially spaced circumferentially extending ridges defining an enclosed chamber with a housing when mounted therein providing an air space barrier insulating the bearing against heat transfer from parts of the housing. Means is provided defining an opening in the wall of said inner tubular member on the side thereof opposite the raceways from the end of the tubular member open to the atmosphere whereby cooling air may enter the open end of the inner tubular member and be discharged through said opening thereby to cool the inner surface of the bearing.

---

The present invention refers to an improved bearing application, especially such applications wherein the bearings during use will be submitted to comparatively high temperature. One example thereof is a bearing for a cooling pump of a motor car engine.

In known designs of such bearing applications the rotors of the fan and of the pump, respectively, are carried out by a solid shaft mounted in conventional ball bearings or in double-row special bearings in which the balls have been arranged to run directly in grooves formed in the shaft. Designs of the last mentioned type are subjected to certain disadvantages, i.e. that the bearings due to the high temperature encountered in an application of this type soon will be worn out. In bearings of this old design heat will be supplied to the bearing on the one hand internally through the solid shaft from the hot cooling liquid and on the other hand to the outside through the bearing housing.

According to the present invention a cheaper design and a considerably improved cooling efficiency is obtained.

The bearing is mainly characterized in the rotatable inner member of the bearing being designed as an elongated tubular body also serving as a shaft for the assembly and being provided on its inner envelope surface with the appropriate number of raceways for rolling bodies located at suitable intervals, and in the outer member of the bearing being shorter than the shaft/inner member thereof and provided with raceways corresponding to those of the inner member, the raceways in the outer member being designed in such a manner, that outwardly directed ridges are formed on the outward envelope surfaces on the other member for annular alignment with the inner surface of the bearing housing.

The invention will in the following be described with reference to the annexed drawing which shows one embodiment of the invention as applied to a cooling water pump for a motor car engine.

The bearing is fitted into a housing having a bearing seat 2. The inner member 3 of the bearing is designed to serve also as a shaft. To the front thereof the rotor of a fan is mounted, the hub of which is denoted by 4. The opposite end of the shaft carries a pump rotor 5. The shaft/inner member is designed as an elongated tubular body and in the outer envelope surface thereof raceways 6 for rolling bodies, in this embodiment balls 7, are provided. The bearing also comprises an outer member 8 provided with correspondingly shaped raceways 9. At the ends of the outer member sealing elements 10 of suitable design are provided. The assembly is driven by means of a wedge rope 11 running in a sheave 12 fixed to the hub 4 of the fan rotor. As the inner member 3 is designed as a tube it will provide a much better cooling of the bearing than the former shaft. Cooling air will enter the open end of the shaft at the fan and flows through the shaft which is provided with a large cooling surface along the inner member. One of the two outlet openings 13 for the air are arranged a distance outside the end of the outer ring turned towards the pump rotor 5.

In connection to these openings a flinger 14 may preferably be arranged. The air passes out through a passage 15 in a bearing housing 1. The member 8 is designed in such a manner that the envelope surface thereof during the formation of the raceways 9 will be provided with circumferential ridges 16. These ridges will serve two purposes; partly they will provide an annular alignment for the outer member in the bearing seat 2 which means that this will not have to be machined in the exact manner as if the member had had a smooth cylindrical outer surface and partly the ridges 16 will define between themselves an air space 17 which in an efficient manner will insulate the bearing against heat transfer from the hot parts of the housing. In a bearing according to the invention the temperature will be reduced to less than half the temperature of a bearing of conventional design.

The outer member as well as the shaft/inner member may be made from suitable tube material and in order to reduce the manufacturing costs preferably be shaped by a rolling operation.

In the embodiment shown the bearing comprises rolling bodies in the form of balls but in other embodiments rollers or needles may be utilized. The number of rows of rolling bodies and the location of these rows along the bearing must be chosen according to the type of the application. The use of the bearing is not limited to pumps of the above mentioned type but the bearing may be used with other rotating machine elements where it is desirable to avoid heat being transferred to the bearing.

What is claimed is:
1. A bearing assembly adapted to be mounted in a housing or the like comprising an elongated inner tubular member having at least two spaced apart circumferentially extending inner raceways on its outer surface, an outer tubular member circumscribing the inner member and spaced therefrom to define an annular space therebetween, said outer member having at least a pair of spaced apart outer raceways confronting said inner raceways, a plurality of rolling elements in the annular space defined by the confronting raceways of the inner and outer tubular members, said outer member having a pair of axially spaced circumferentially extending ridges defining an enclosed chamber with a housing when mounted therein providing an air space barrier insulating the bearing against heat transfer from parts of the housing and means defining an opening in the wall of said inner tubular member on the side thereof opposite the raceways from the end of the tubular member open to the atmosphere whereby cooling air may enter the open end of the inner tubular member and be discharged through said opening thereby to cool the inner surface of the bearing.

2. In combination, a bearing assembly, a housing having a seat therein within which the bearing assembly is mounted, said housing having an internal passage opening to the atmosphere, said bearing assembly comprising an elongated inner tubular member having at least two spaced apart circumferentially extending inner raceways on its outer surface, an outer tubular member circumscribing the inner member and spaced therefrom to define an annular space therebetween, said outer member having at least a pair of spaced apart outer raceways confronting said inner raceways, a plurality of rolling elements in the annular space defined by the confronting raceways of the inner and outer tubular members, said outer member having a pair of axially spaced circumferentially extending ridges defining an enclosed chamber with the housing when mounted therein providing an air space barrier insulating the bearing against heat transfer from parts of the housing and means defining an opening in the wall of said inner tubular member on the side thereof opposite the raceways from the end of the tubular member open to the atmosphere, said opening in the wall of said tubular member in fluid communication with the passage in said housing, whereby cooling air may enter the open end of the inner tubular member and be discharged through said opening thereby to cool the inner surface of the bearing.

3. A combination as claimed in claim 2 including a flinger mounted adjacent the opening in said inner tubular member to guide circulation of said fluid through the inner tubular member.

4. A combination as claimed in claim 2 including a rotor mounted on the terminal end of said inner tubular member opposite said end open to the atmosphere and including means for rotating said inner tubular member and said rotor relative to the housing.

References Cited

UNITED STATES PATENTS 2,719,765   10/1955   Menne.

FOREIGN PATENTS 805,970   6/1957   Germany.
821,887   11/1957   Germany.

MARTIN P. SCHWADRON, Primary Examiner

F. SUSKO, Assistant Examiner